United States Patent
Obi et al.

(10) Patent No.: US 12,202,470 B2
(45) Date of Patent: Jan. 21, 2025

(54) VEHICLE CONTROL APPARATUS AND VEHICLE

(71) Applicant: HONDA MOTOR CO., LTD., Tokyo (JP)

(72) Inventors: Masakazu Obi, Wako (JP); Kosuke Sakamoto, Wako (JP); Jumpei Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 451 days.

(21) Appl. No.: 17/194,463

(22) Filed: Mar. 8, 2021

(65) Prior Publication Data

US 2021/0291822 A1 Sep. 23, 2021

(30) Foreign Application Priority Data

Mar. 19, 2020 (JP) ................. 2020-048912

(51) Int. Cl.
*B60W 30/09* (2012.01)
*B60W 10/04* (2006.01)
(Continued)

(52) U.S. Cl.
CPC ............ *B60W 30/09* (2013.01); *B60W 10/04* (2013.01); *B60W 10/18* (2013.01); *B60W 30/06* (2013.01);
(Continued)

(58) Field of Classification Search
CPC ...... B60W 30/09; B60W 10/04; B60W 10/18; B60W 30/06; B60W 40/105;
(Continued)

(56) References Cited

U.S. PATENT DOCUMENTS 8,843,286 B2   9/2014   Tezuka et al.
9,409,574 B2   8/2016   Gokan et al.
(Continued)

FOREIGN PATENT DOCUMENTS

CN   103569114 A   2/2014
CN   104755344 A   7/2015
(Continued)

OTHER PUBLICATIONS

Japanese Office Action issued for Japanese Patent Application No. 2020-048912 mailed on Dec. 20, 2021 (with Partial Translation).
(Continued)

*Primary Examiner* — Thomas Ingram
*Assistant Examiner* — Michael J Herrera
(74) *Attorney, Agent, or Firm* — Thomas | Horstemeyer, LLP

(57) ABSTRACT

A vehicle control apparatus having an unintended start suppression function of suppressing an unintended start is provided. The apparatus comprises a distance detection unit configured to detect a distance to an obstacle; a speed detection unit configured to detect a speed of an ego-vehicle; and a suppression support unit configured to perform suppression support for the speed of the ego-vehicle based on the speed and the distance to the obstacle, wherein the suppression support unit changes an operation distance for performing the suppression support depending on whether the unintended start suppression function has operated.

4 Claims, 4 Drawing Sheets

(51) Int. Cl.
  *B60W 10/18*  (2012.01)
  *B60W 30/06*  (2006.01)
  *B60W 40/105* (2012.01)

(52) U.S. Cl.
  CPC ....... *B60W 40/105* (2013.01); *B60W 2520/06* (2013.01); *B60W 2554/4042* (2020.02); *B60W 2554/802* (2020.02)

(58) Field of Classification Search
  CPC ..... B60W 2520/06; B60W 2554/4042; B60W 2554/802; B60W 10/20; B60W 2420/42; B60W 2420/52; B60W 2520/10; B60W 2540/18; B60W 50/12; B60W 30/17; B60W 10/06; B60T 7/12
  See application file for complete search history.

(56) References Cited

U.S. PATENT DOCUMENTS

| | | | |
|---|---|---|---|
| 11,001,255 B2 | 5/2021 | Fukuman et al. | |
| 2004/0122573 A1* | 6/2004 | Mizutani | B60T 8/3275 701/45 |
| 2006/0047402 A1* | 3/2006 | Irion | B60K 31/0008 701/93 |
| 2007/0276574 A1* | 11/2007 | Isaji | B60T 7/22 701/96 |
| 2010/0010715 A1* | 1/2010 | Inoue | B60T 7/22 701/51 |
| 2011/0196591 A1* | 8/2011 | Kuze | B60W 30/16 701/96 |
| 2012/0259524 A1* | 10/2012 | Miyazaki | F02D 29/02 701/70 |
| 2013/0041564 A1* | 2/2013 | Doi | B60W 50/087 701/70 |
| 2014/0025267 A1 | 1/2014 | Tezuka et al. | |
| 2014/0129103 A1* | 5/2014 | Tohta | B60W 10/026 701/67 |
| 2015/0046054 A1* | 2/2015 | Takahashi | B60T 7/22 701/70 |
| 2015/0307091 A1 | 10/2015 | Gokan et al. | |
| 2016/0332622 A1* | 11/2016 | Shiraishi | B60W 30/162 |
| 2018/0170368 A1 | 6/2018 | Fukuman et al. | |
| 2018/0201262 A1* | 7/2018 | Yoon | B60W 10/10 |
| 2019/0009774 A1* | 1/2019 | Yamashita | B60W 30/09 |
| 2019/0351906 A1* | 11/2019 | Oh | B60W 30/095 |
| 2021/0237720 A1 | 8/2021 | Chen et al. | |

FOREIGN PATENT DOCUMENTS

| | | |
|---|---|---|
| JP | 2012-006504 A | 1/2012 |
| JP | 2014-034289 A | 2/2014 |
| JP | 2015-102032 A | 6/2015 |
| JP | 2017-016305 A | 1/2017 |
| WO | 2019/159677 A1 | 8/2019 |

OTHER PUBLICATIONS

Chinese Office Action issued for Chinese Patent Application No. 202110266887.9 mailed on Jul. 7, 2023 (with Partial Translation).

* cited by examiner

FIG. 4

| VEHICLE SPEED [Km/h] | BREAK INSTRUCTRION DISTANCE (ONLY AEB) [cm] | BREAK INSTRUCTRION DISTANCE (OMTC IN OPERATION) [cm] | BREAK INSTRUCTRION DISTANCE (WHEN PARKING) [cm] |
|---|---|---|---|
| 0 | 0 | 0 | 0 |
| 1 | 0 | 60 | 25 |
| 2 | 0 | 70 | 35 |
| 3 | 70 | 80 | 45 |
| 4 | 80 | 90 | 80 |
| 5 | 90 | 100 | 90 |
| 6 | 100 | 110 | 100 |
| 7 | 120 | 120 | 120 |
| 8 | 120 | 120 | 120 |
| 9 | 120 | 120 | 120 |
| 10 | 120 | 120 | 120 |
| 11 | CONTROL BASED ON TTC | CONTROL BASED ON TTC | CONTROL BASED ON TTC |

VEHICLE CONTROL APPARATUS AND VEHICLE

CROSS-REFERENCE TO RELATED APPLICATION(S)

This application claims priority to and the benefit of Japanese Patent Application No. 2020-048912 filed on Mar. 19, 2020, the entire disclosure of which is incorporated herein by reference.

BACKGROUND OF THE INVENTION

Field of the Invention

The present invention relates to a vehicle control apparatus and a vehicle including the same.

Description of the Related Art

One of driving support functions of an automobile is an autonomous emergency brake (to be abbreviated as AEB). The AEB is a device aiming at avoiding collision or reducing an impact by detecting the possibility of collision against an obstacle such as another vehicle, warning the driver in accordance with the detection, and suppressing the vehicle speed by braking.

In parking or the like, a vehicle is sometimes driven in a place with many obstacles such as other vehicles. In such driving at the time of parking, the operation of the AEB may impede smooth driving. There is proposed a technique of changing the operation criterion of the AEB by discriminating driving at the time of parking from normal driving (see Japanese Patent Laid-Open No. 2014-34289).

In Japanese Patent Laid-Open No. 2014-34289, if it is determined that parking driving is being performed, control of making the reference distance shorter than in normal driving is performed. However, there is neither consideration nor mention concerning another situation.

SUMMARY OF THE INVENTION

The present invention provides a vehicle control apparatus and a vehicle, for which a condition for operating an autonomous emergency brake in a case in which an unintended start suppression function operates is appropriately set.

The present invention has the following arrangement. According to one aspect of the present invention, there is provided a vehicle control apparatus having an unintended start suppression function of suppressing an unintended start, comprising: a distance detection unit configured to detect a distance to an obstacle; a speed detection unit configured to detect a speed of an ego-vehicle; and a suppression support unit configured to perform suppression support for the speed of the ego-vehicle based on the speed and the distance to the obstacle, wherein the suppression support unit changes an operation distance for performing the suppression support depending on whether the unintended start suppression function has operated.

According to the present invention, the distance with which a function of suppressing a vehicle speed operates is set in accordance with the speed of a vehicle, thereby performing control in which the driver can easily be prevented from having a sense of incongruity.

BRIEF DESCRIPTION OF THE DRAWINGS

FIG. 4 is a view showing an example of an AEB operation map for speed suppression.

DESCRIPTION OF THE EMBODIMENTS

Figure 1:
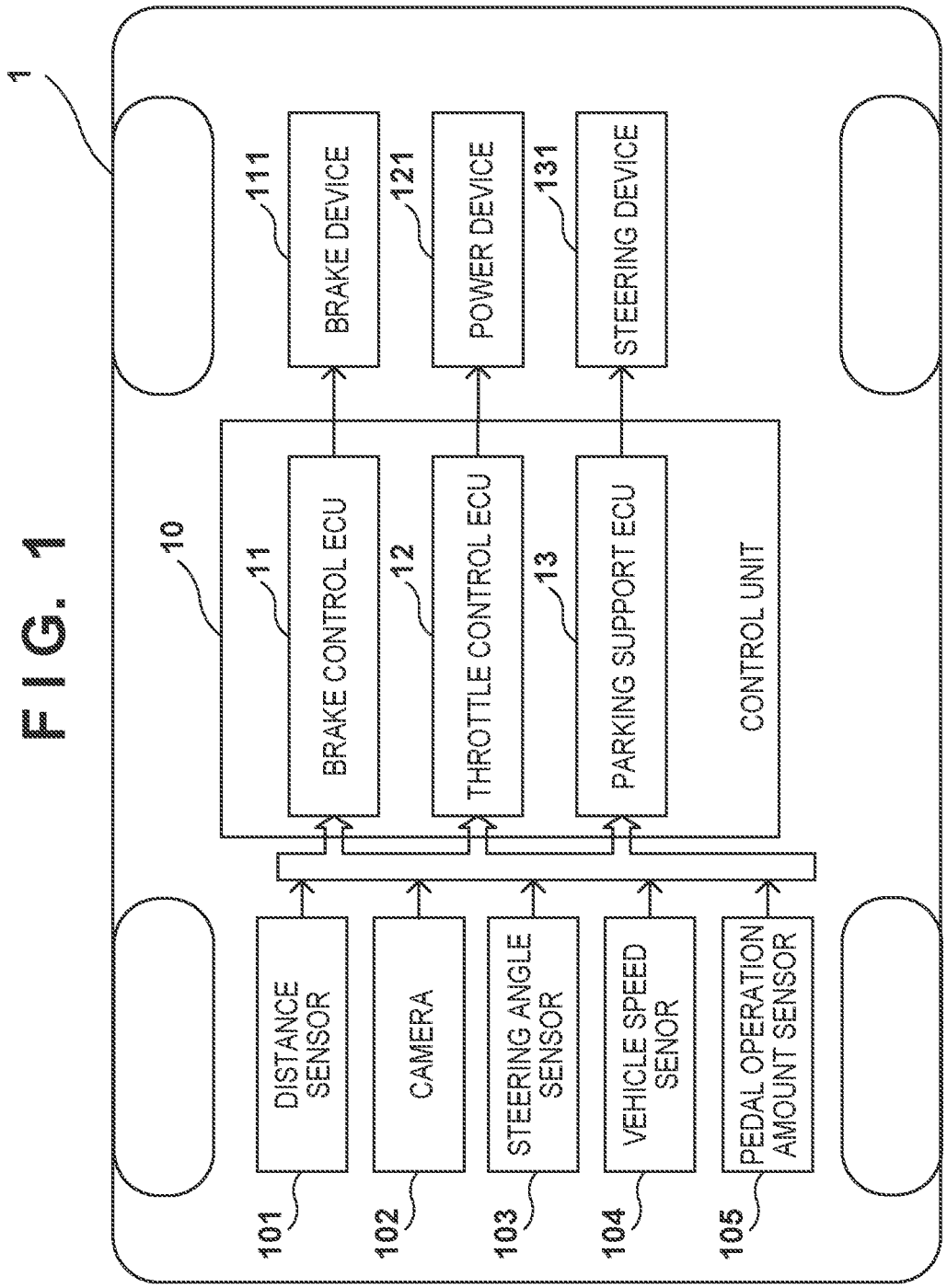
FIG. 1 is a block diagram showing an example of a driving support system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

System Arrangement

FIG. 1 shows a block diagram of a driving support system according to this embodiment and, more particularly, a system including an autonomous emergency brake and an automatic parking support function. Referring to FIG. 1, a control unit 10 controls driving of a vehicle 1. The control unit 10 includes a brake control ECU 11 that controls a brake device 111 to apply a brake to the vehicle and suppress the speed. The brake control ECU 11 also performs vehicle speed suppression support, for example, control of an autonomous emergency brake (AEB). A parking support ECU 13 that supports steering in parking such as backward parking or parallel parking is also included in the control unit 10. The automatic parking support function performs only steering control, and a throttle or braking operation, switching between forward and backward traveling, and the like are performed by the driver. Hence, the parking support ECU 13 controls a steering device 131 such as an electric power steering device. A throttle control ECU 12 controls a power device 121 such as an engine or an electric motor. Although the electric motor does not include a throttle, controlling the output of the electric motor will be referred to as throttle control here. When the AEB operates, the throttle control ECU 12 suppresses the speed by suppressing driving of the power device. Note that these ECUs need not be ECUs independent for the functions. For example, the function of each ECU shown in FIG. 1 may be implemented by one or a plurality of ECUs. Note that in the above description, the automatic parking support function performs only steering control. The invention according to this embodiment can also be applied to even a case in which a parking support function of automatically performing acceleration/deceleration is used. Each ECU may include at least one central processing unit (also referred to as a CPU or a processor) and at least one memory to execute instructions of a program stored in the memory.

Both the autonomous emergency brake and the automatic parking support control driving support based on inputs from various kinds of sensors configured to detect an external state or a vehicle state. The various kinds of sensors include the following. The sensors include a distance sensor 101, a camera 102, a steering angle sensor 103, a vehicle speed sensor 104, and a pedal operation amount sensor (also referred to as accelerator opening sensor) 105.

The distance sensor 101 may be a sonar provided on each of the front and rear sides and at each of four corners of the vehicle and configured to detect the distance to an obstacle by an ultrasonic wave or the like. The camera 102 may be a camera provided, for example, at the upper center portion on the inner side of the front windshield. The distance to an obstacle can also be detected from an image of the camera 102. At the time of low-speed driving such as parking driving, the distance may be measured by the distance sensor 101, and the camera 102 need not be used for distance measurement. The camera 102 may be used, as a matter of course.

The steering angle sensor 103 detects the direction in which the front wheels face or the rotation position of a steering shaft. The parking support system 13 controls the steering device 131 such that the steering angle detected by the steering angle sensor 103 becomes a target steering angle. The vehicle speed sensor 104 detects the current speed of the vehicle 1. The vehicle speed sensor 104 may directly detect the traveling speed of the vehicle 1, or may detect the speed of rotation of the wheels and convert it into the vehicle speed. The pedal operation amount sensor 105 is a sensor configured to detect the press amount of a throttle pedal. The throttle control ECU 12 controls the output of the power device 121 based on the press amount of the throttle pedal detected by the pedal operation amount sensor. In the unintended start suppression function according to this embodiment, the power device 121 is not controlled only based on the press amount of the throttle pedal. The power device 121 may be controlled in accordance with at least the speed at that time and the presence/absence of an obstacle on the course. Additionally, for example, a position sensor such as a global positioning system (GPS) receiver that specifies the current position may be provided. If a position sensor is provided, it can be determined, by collation with map information (not shown) held by the vehicle 1, that the current position is, for example, a parking area.

AEB Operation Map

The brake control ECU 11 operates the AEB in accordance with a table (to be referred to as an AEB operation map in this embodiment for the descriptive convenience) showing, for each traveling speed of the self-vehicle (also referred to as the ego-vehicle), a reference distance up to an obstacle for which the AEB is operated. FIG. 4 shows an example of the AEB operation map. In FIG. 4, the left column represents the vehicle speed. FIG. 4 shows a map from a speed of 0 (stop) to 10 Km/h at an interval of 1 Km/h. At a speed of 11 Km/h, control is switched from AEB control according to the distance to an obstacle, which will be described in this embodiment, to control based on a predicted time (TTC) until collision.

The column on the left side at the center shows an AEB operation distance in normal driving, that is, driving that is neither parking driving nor driving with the operation of the unintended start suppression function (to be also referred to as CMTC hereinafter). In the example shown in FIG. 4, until a speed of 0 Km/h to 2 Km/h, the AEB operation distance is 0, that is, the AEB does not operate. At a speed of 3 Km/h, the operation distance is 70 cm. Until 6 Km/h from there, the operation distance increases by 10 cm every time the speed increases by 1 Km/h. At a speed of 7 Km/h to 10 Km/h, the operation distance of the AEB is constant at 120 cm.

The right column in FIG. 4 shows an AEB operation distance concerning parking driving. In the example shown in FIG. 4, at a speed of 0 Km/h, the AEB operation distance is 0, that is, the AEB does not operate. At a speed of 1 Km/h, the operation distance is 25 cm. Until 3 Km/h from there, the operation distance increases by 10 cm every time the speed increases by 1 Km/h. At a speed of 4 Km/h to 10 Km/h, the operation distance of the AEB is the same as in normal driving.

The right column at the center in FIG. 4 shows an AEB operation distance at the time of a CMTC operation. In the example shown in FIG. 4, at a speed of 0 Km/h, the AEB operation distance is 0, that is, the AEB does not operate. At a speed of 1 Km/h, the operation distance is 60 cm. Until 7 Km/h from there, the operation distance increases by 10 cm every time the speed increases by 1 Km/h. At a speed of 7 Km/h to 10 Km/h, the operation distance of the AEB is 120 cm as in normal driving.

As described above, within the speed range from 1 Km/h to 2 Km/h, the operation distance of the AEB at the time of the CMTC operation is longer than the operation distance in normal driving. That is, the AEB operates at 60 cm and 70 cm at which the AEB does not operate in normal driving. This also applies to a speed of 3 Km/h to 6 Km/h. In this speed range, the operation distance is a little longer (more specifically, by 10 cm) than in normal driving. As described above, even in the speed range in which the AEB does not operate in normal driving, the AEB is operated at the time of the CMTC operation, thereby ensuring a larger margin. That is, a case in which the CMTC operates is a case in which driving that causes a sudden start unless the CMTC operates is performed. When the operation reference of the AEB is relaxed, a larger margin can be ensured, and the driver can be given a sense of safety. Note that the same control as in normal driving is performed when the speed is a predetermined speed or more, than is, 7 Km/h or more in FIG. 4 because the margin can be ensured by the same control as in normal driving at this speed, and the driver can be prevented from having a sense of incongruity. The AEB operation map shown in FIG. 4 is held by, for example, the brake control ECU 11, and the map for normal driving and the map for parking driving are selectively referred to in accordance with the situation.

Unintended Start Suppression Function

Figure 2A:
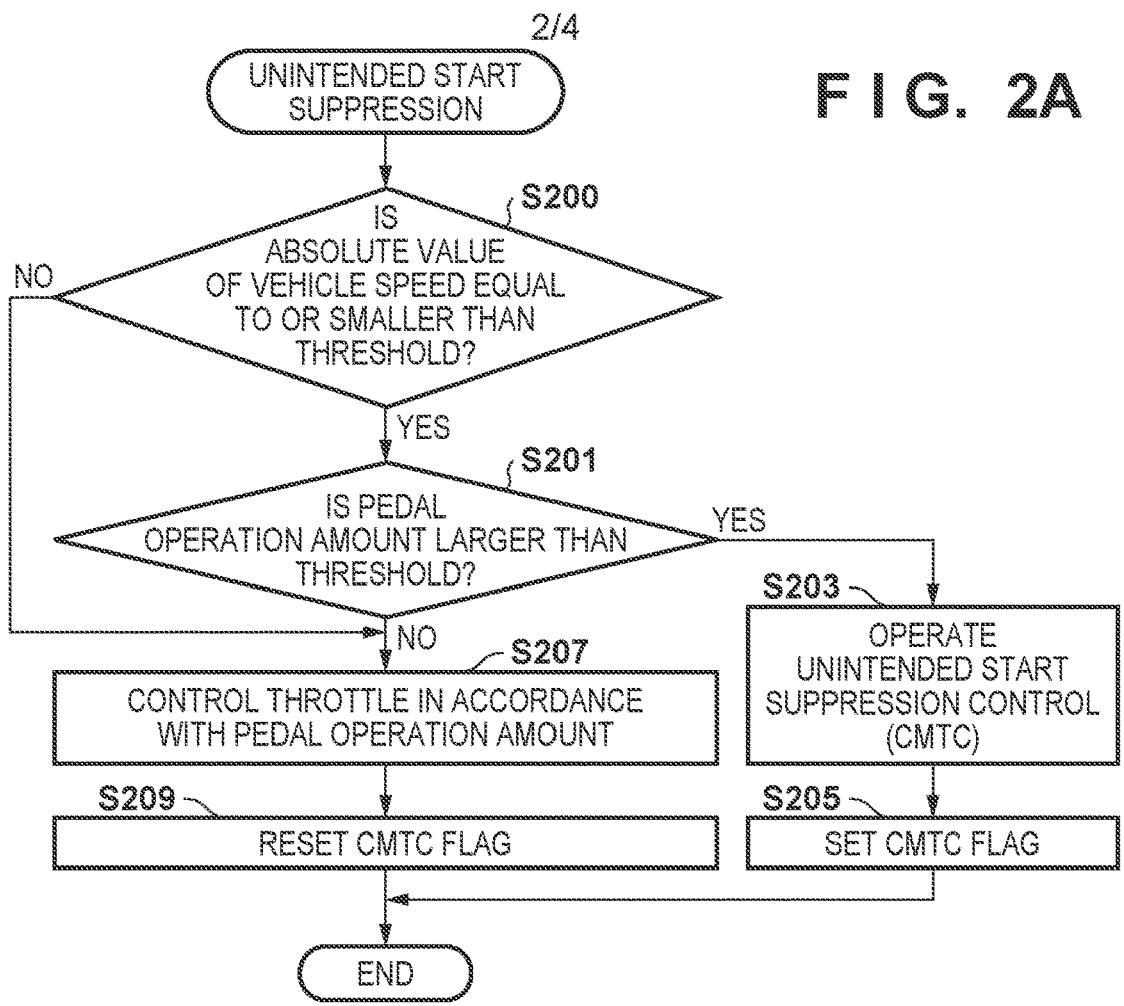
FIGS. 2A and 2B are flowcharts showing a procedure of switching AEB operation maps for unintended start suppression control and speed suppression.

FIG. 2A shows an example of a procedure of controlling the unintended start suppression function. This procedure may be executed by, for example, the throttle control ECU 12. The operation amount of the throttle pedal detected by the pedal operation amount sensor 105 is input to the throttle control ECU 12 continuously or at a very short predetermined time interval. Using this as input data, the procedure shown in FIG. 2A is repetitively executed.

First, it is determined whether the absolute value of the current vehicle speed is equal to or smaller than a predetermined threshold (step S200). The absolute value means that the direction of travel of the vehicle 1 does not matter whether it is traveling forward or backward. If the absolute value of the vehicle speed is equal to or smaller than the threshold, the process branches to step S201. If the absolute value is larger than the threshold, the process branches to step S207. Here, the threshold may be, for example, 0, or may be set to, for example, 2 to 4 Km/h in consideration of creeping or a start on a downhill. Note that the determination in step S200 may be done using different thresholds for forward traveling and backward traveling. For example, it may be determined whether or not the vehicle speed is less than a threshold or the vehicle is traveling backward. This is an example in which the threshold for backward traveling is set to 0, and the threshold for forward traveling is set to a predetermined value larger than 0. In this case, if it is backward traveling, the process branches to step S201 independently of the vehicle speed.

If the vehicle speed is equal to or smaller than the threshold, it is determined next whether the operation amount of the throttle pedal is larger than a predetermined threshold (step S201). The case in which the operation amount of the throttle pedal is larger than a predetermined threshold is a case in which such an operation is performed that the press amount is large, and a sudden start occurs unless a measure is taken. This threshold may be decided, for example, experimentally. If the throttle pedal operation amount is equal to or smaller than the threshold, the throttle control ECU 12 controls the power device 121 in accordance with the operation amount of the throttle pedal (step S207). In addition, a CMTC flag representing that the unintended start suppression function has operated is reset (step S209). Note that instead of resetting the CMTC flag in step S209, the CMTC flag may be set and then reset after a predetermined time elapses or after the vehicle moves by a predetermined distance. Instead, once the CMTC flag is set in accordance with the procedure shown in FIG. 2A, the elapse of a predetermined time or movement by a predetermined distance may be monitored, and execution of the procedure shown in FIG. 2A may be inhibited until the elapse of the predetermined time or movement by the predetermined distance.

If the operation amount of the throttle pedal is larger than the threshold, the throttle control ECU 12 performs control of operating the unintended start suppression function (step S203). That is, control is performed such that the output of the power device 121 becomes remarkably small with respect to the operation amount of the throttle pedal, or the power device 121 stops. Note that if control is performed based on the throttle pedal operation amount, the output of the power device 121 may temporarily increase before the CMTC operation. Hence, in step S201, it may be determined whether the operation speed of the throttle pedal exceeds a predetermined threshold. After that, the CMTC flag representing that the unintended start suppression function has operated is set (step S205). Note that the CMTC flag is provided in a memory referable by the brake control ECU 11, for example, a memory shared by the brake control ECU 11.

AEB Operation Map Switching Processing

Figure 2B:
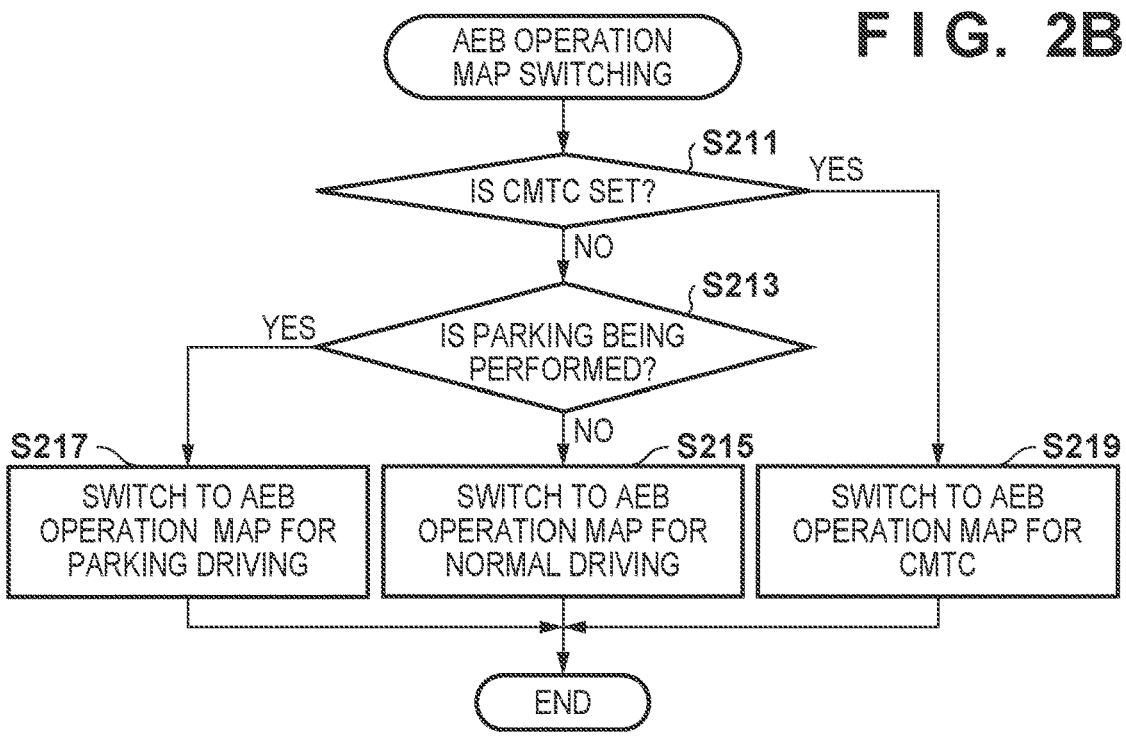

FIG. 2B shows an example of a procedure of switching the AEB operation map between normal driving and parking driving. This procedure may be performed by, for example, the brake control ECU 11. The procedure shown in FIG. 2B may be repetitively executed at a predetermined time interval, for example, every 1 sec. First, it is determined whether the CMTC flag is set (step S211). The CMTC flag is set in the procedure shown in FIG. 2A and then reset, thereby representing whether the unintended start suppression function is operating. If the CMTC flag is set, the AEB operation map to be referred to is switched to the AEB operation map for CMTC. For example, the AEB operation map for CMTC is loaded as the AEB operation map to be referred to. The AEB operation map for CMTC is the map shown in the right column at the center in FIG. 4.

On the other hand, if the CMTC flag is not set, it is determined whether parking is being performed (step S213). The case in which parking is being performed may be a case in which, for example, it is determined, by a position sensor, that the self-vehicle is located in a parking area, or a case in which an automatic parking system is operating. If the unintended start suppression function is not set, and parking is not being performed, it is estimated that normal driving is progressing. In this case, the AEB operation map to be referred to is switched to the AEB operation map for normal driving (step S215). If parking is being performed, the AEB operation map to be referred to is switched to the AEB operation map for parking driving (step S217).

As described above, the operation distance of the AEB is changed depending on the operation state of the unintended start suppression function or whether parking driving is being performed. It should be noted here that the unintended start suppression function is referred to more preferentially than parking driving when changing the operation distance of the AEB. Hence, even at the time of parking, if the unintended start suppression function operates, the operation distance of the AEB can be made longer, and control be performed with a margin.

Brake Control

Figure 3:
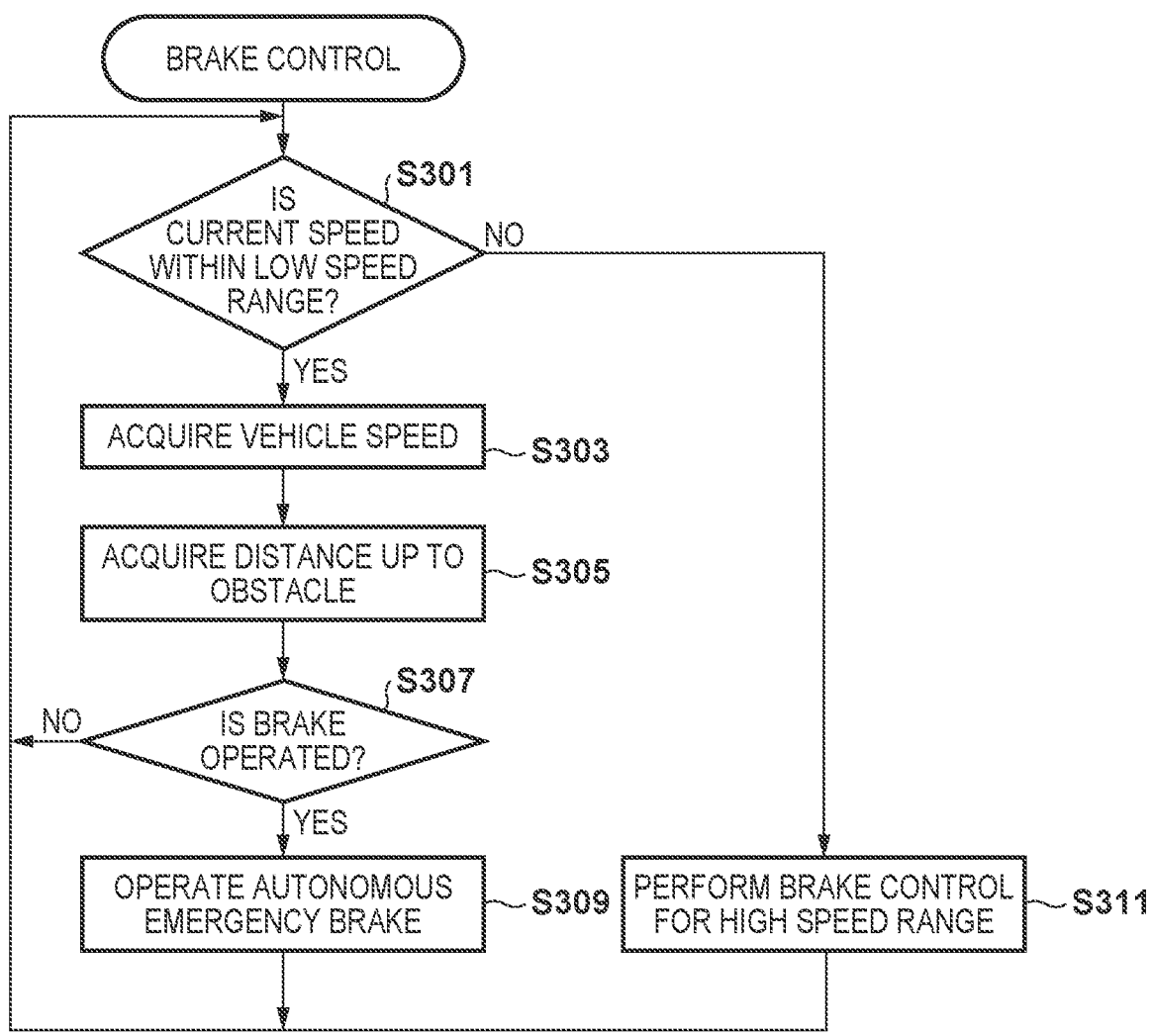
FIG. 3 is a flowchart showing a procedure at the time of an operation of speed suppression.

FIG. 3 shows an example of a procedure of operating the AEB. The procedure shown in FIG. 3 may be executed by, for example, the brake control ECU 11. First, it is determined whether the current speed is within a low speed range (step S301). The low speed range is a speed range in which the AEB operates in accordance with the speed and the distance to an obstacle, and is the speed range of 0 to 10 Km/h in the example shown in FIG. 4. That is, according to FIG. 4, it may be determined, in step S301, whether the current speed is 10 Km/h or less. If it is determined that the current speed is within the low speed range, the vehicle speed is acquired from the vehicle speed sensor 104 again (step S303), and the distance up to the obstacle is acquired from the distance sensor 101 (step S305). Note that the distance up to the obstacle acquired here can be a value from the distance sensor on the front side when the vehicle is traveling forward, or a value from the distance sensor on the rear side when the vehicle is traveling backward.

Next, it is determined whether a condition for operating the brake, that is, operating the AEB is satisfied (step S307). This determination is done by referring to the AEB operation map for reference. For example, the operation distance corresponding to the current vehicle speed is referred to, and if the distance up to the obstacle is smaller than the value, it may be determined that the condition for operating the AEB is satisfied. Note that if distances up to the obstacle are acquired from a plurality of distance sensors, the determination may be performed using the smallest value. For example, when referring to the AEB operation map for the unintended start suppression function, if the current speed is 2 Km/h, and the shortest distance to the obstacle is 70 cm, it can be determined that the condition for operating the AEB is satisfied. On the other hand, when the AEB operation map for normal driving is referred to using the same speed and distance, it is determined that the condition for operating the AEB is not satisfied. Also, for example, when referring to the AEB operation map for the unintended start suppression function, if the current speed is 3 Km/h, and the distance to the obstacle is 80 cm, it can be determined that the condition for operating the AEB is satisfied. On the other hand, when the AEB operation map for normal driving is referred to using the same speed and distance, it is determined that the condition for operating the AEB is not satisfied.

If it is determined, in step S307, that the condition for operating the AEB is satisfied, the autonomous emergency brake is operated (step S309). At this time, the output of the power device may be stopped in cooperation with the throttle control ECU 12. In place of the stop of power, the clutch in an internal combustion engine may be disengaged. On the other hand, if it is determined, in step S301, that the current speed is not within the low speed range, speed suppression control for a high speed range, for example, brake control is performed (step S311). A description of the brake control will be omitted here. The procedure of the brake control is repetitively executed during traveling of the vehicle.

Effect of Embodiment

In the above-described way, the AEB is controlled by switching the AEB operation map between a case in which the unintended start suppression function is operating and a normal driving state in which the unintended start suppression function is not operating. Hence, when the unintended start suppression function operates, AEB control for giving a sense of safety to the driver can be performed in consideration of a situation in which an error occurs in the driving operation. Also, AEB control for further giving a sense of safety according to the situation can be implemented by switching the AEB operation map while giving priority to the unintended start suppression function over the AEB at the time of parking. Note that this applies not only to the AEB but also to a warning to the driver.

Other Embodiments

Note that in the above-described embodiment, an example in which the AEB, that is, the autonomous emergency brake is operated to brake the vehicle has been described. However, in place of braking by the autonomous emergency brake, a warning to the driver may be issued. Alternatively, a warning to the driver may be issued in addition to braking by the autonomous emergency brake.

In the above-described embodiment, the unintended start suppression function may be operated not in a case in which only the conditions of steps S200 and S201 of FIG. 2A are satisfied but in a case in which these conditions are satisfied, and the distance sensor 101 detects an obstacle within a predetermined distance in the advancing direction. Although the CMTC flag is reset in step S209, it may be reset at another timing in that case. For example, the CMTC flag may be reset only when the obstacle that has triggered the operation of the unintended start suppression function is not detected any more. In this case, once the unintended start suppression function operates, the CMTC flag is on as long as the obstacle that has triggered the operation is located within a predetermined distance. For this reason, in the AEB operation map switching processing shown in FIG. 2B, the AEB operation map for CMTC is used during that time, and the safety level and the sense of safety can be increased by further relaxing the operation condition of the AEB.

Summary of Embodiment

The above-described embodiment can be summarized as follows.

(1) According to the first aspect of the present invention, there is provided a vehicle control apparatus having an unintended start suppression function of suppressing an unintended start, comprising:
  a distance detection unit configured to detect a distance to an obstacle;
  a speed detection unit configured to detect a speed of an ego-vehicle; and
  a suppression support unit configured to perform suppression support for the speed of the ego-vehicle based on the speed and the distance to the obstacle,
  wherein the suppression support unit changes an operation distance for performing the suppression support depending on whether the unintended start suppression function has operated.

With this arrangement, it is possible to implement suppression support for the speed of the vehicle, which further gives a margin and a sense of safety, at the time of the operation of the unintended start suppression function.

(2) According to the second aspect of the present invention, there is provided the vehicle control apparatus described in (1),
  wherein at least for a predetermined speed, if the unintended start suppression function has operated, the suppression support unit changes the operation distance to a long operation distance as compared to a case in which the unintended start suppression function is not operating.

With this arrangement, at the time of the operation of the unintended start suppression function, the speed of the vehicle is suppressed in a longer operation distance. It is therefore possible to implement suppression support for the speed of the vehicle, which further gives a margin and a sense of safety, at the time of the operation of the unintended start suppression function.

(3) According to the third aspect of the present invention, there is provided the vehicle control apparatus described in (1) or (2),
  wherein if the unintended start suppression function has operated, as compared to a case in which the unintended start suppression function is not operating, the suppression support unit changes the operation distance to a long operation distance if the speed is less than a threshold, and does not change the operation distance if the speed is not less than the threshold.

With this arrangement, at the time of the operation of the unintended start suppression function, the operation distance at a lower vehicle speed is made long. It is therefore possible to implement suppression support for the speed of the vehicle, which further gives a margin and a sense of safety, at the time of the operation of the unintended start suppression function.

(4) According to the fourth aspect of the present invention, there is provided the vehicle control apparatus described in any one of (1) to (3),
  wherein the suppression support unit changes the operation distance even during parking driving, and
  if the unintended start suppression function has operated, and the parking driving is being performed, the suppression support unit changes the operation distance in accordance with the unintended start suppression function.

With this arrangement, even at the time of parking, the speed is suppressed while giving priority to the operation of the unintended start suppression function. It is therefore possible to implement suppression support for the speed of the vehicle, which further gives a margin and a sense of safety.

(5) According to the fifth aspect of the present invention, there is provided the vehicle control apparatus described in any one of (1) to (4),
  wherein the unintended start suppression function operates on condition that the speed is not more than a threshold, and an operation amount of a throttle pedal or an operation speed of the throttle pedal exceeds a threshold, and
  if the condition is satisfied, the suppression support unit determines that the unintended start suppression function has operated.

With this arrangement, only when the unintended start suppression function is operating, the suppression support for the speed at the time of the operation of the unintended start suppression function is performed, thereby reducing a sense of incongruity at the time of driving.

(6) According to the sixth aspect of the present invention, there is provided the vehicle control apparatus described in any one of (1) to (4),
wherein the unintended start suppression function operates when the speed is not more than a threshold, an operation amount of a throttle pedal or an operation speed of the throttle pedal exceeds a threshold, and the distance to the obstacle detected by the distance detection unit is smaller than a threshold, and
during a time when the obstacle that has triggered the operation of the unintended start suppression function is being detected, the suppression support unit determines that the unintended start suppression function has operated.

With this arrangement, if the unintended start suppression function has operated, as long as the obstacle exists even after that, suppression support for the speed at the time of the operation of the unintended start suppression function is performed. It is therefore possible to implement suppression support for the speed of the vehicle, which further gives a margin and a sense of safety.

(7) According to the seventh aspect of the present invention, there is provided a vehicle including the vehicle control apparatus described in (1) to (6).

With this arrangement, it is possible to implement suppression support for the speed of the vehicle, which further gives a margin and a sense of safety, even at the time of the operation of the unintended start suppression function.

The invention is not limited to the foregoing embodiments, and various variations/changes are possible within the spirit of the invention.

What is claimed is:

1. A vehicle control apparatus having an unintended start suppression function of suppressing an unintended start by controlling a power device such that an output of the power device becomes smaller than an operation amount of a throttle pedal or the power device stops, comprising:
at least one processor; and
at least one memory comprising at least one program, wherein the at least one program is configured to cause the at least one processor to:
detect a distance to an obstacle;
detect a speed of an ego-vehicle; and
perform suppression support for the speed of the ego-vehicle by braking the ego-vehicle based on the speed and the distance to the obstacle,
wherein an operation distance for performing the suppression support is set according to the speed of the vehicle, and at least for a predetermined speed, in a case where the unintended start suppression function has operated, in the suppression support, the operation distance is changed to a long operation distance as compared to a case in which the unintended start suppression function is not operating according to the speed of the vehicle,
wherein the unintended start suppression function operates when the speed is not more than a threshold, an operation amount of a throttle pedal or an operation speed of the throttle pedal exceeds a threshold, and the distance to the obstacle detected is smaller than a threshold, and
once the unintended start suppression function operates, the long operation distance is used as the operation distance while the obstacle that has triggered the operation of the unintended start suppression function is being detected.

2. The apparatus according to claim 1, wherein if the unintended start suppression function has operated, as compared to a case in which the unintended start suppression function is not operating, in the suppression support, the operation distance is changed to a long operation distance if the speed is less than a threshold, and does not change the operation distance if the speed is not less than the threshold.

3. The apparatus according to claim 1, wherein in the suppression support, the operation distance is changed even during parking driving, and
if the unintended start suppression function has operated, and the parking driving is being performed, in the suppression support, the operation distance is changed in accordance with the unintended start suppression function.

4. A vehicle including a vehicle control apparatus having an unintended start suppression function of suppressing an unintended start by controlling a power device such that an output of the power device becomes smaller than an operation amount of a throttle pedal or the power device stops, the vehicle control apparatus comprising:
at least one processor; and
at least one memory comprising at least one program, wherein the at least one program is configured to cause the at least one processor to:
detect a distance to an obstacle;
detect a speed of an ego-vehicle; and
perform suppression support for the speed of the ego-vehicle by braking the ego-vehicle based on the speed and the distance to the obstacle,
wherein an operation distance for performing the suppression support is set according to the speed of the vehicle, and at least for a predetermined speed, in a case where the unintended start suppression function has operated, in the suppression support, the operation distance is changed to a long operation distance as compared to a case in which the unintended start suppression function is not operating according to the speed of the vehicle,
wherein the unintended start suppression function operates when the speed is not more than a threshold, an operation amount of a throttle pedal or an operation speed of the throttle pedal exceeds a threshold, and the distance to the obstacle detected is smaller than a threshold, and
once the unintended start suppression function operates, the long operation distance is used as the operation distance while the obstacle that has triggered the operation of the unintended start suppression function is being detected.

\* \* \* \* \*